Nov. 13, 1956     R. J. POWELL     2,770,511
WRIST PIN ASSEMBLY
Filed Nov. 22, 1954
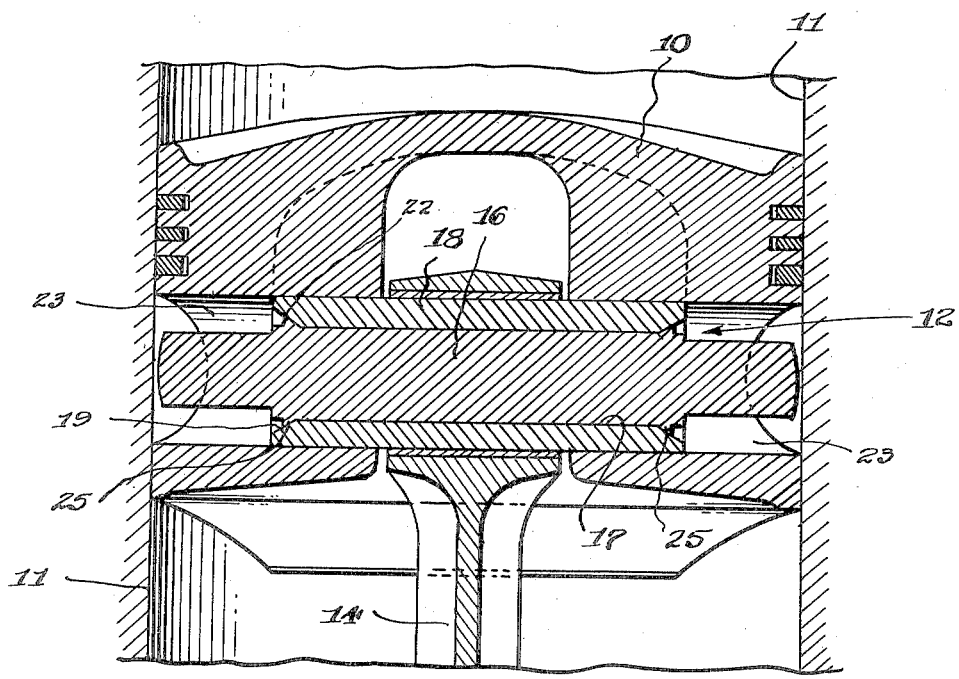
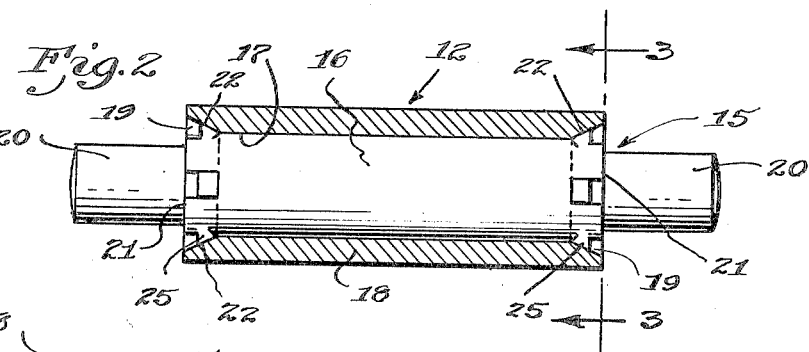
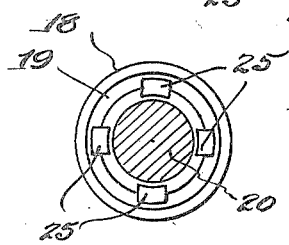
INVENTOR.
Robert J. Powell
BY
Hauke & Hardesty,
Attorneys.

2,770,511
WRIST PIN ASSEMBLY

Robert J. Powell, Muskegon, Mich., assignor to Continental Motors Corporation, Detroit and Muskegon, Mich., a corporation of Virginia Application November 22, 1954, Serial No. 470,350

3 Claims. (Cl. 309—19)

My invention relates to a piston and wrist pin assembly and more particularly to a composite fabricated structure constructed to minimize the chances of scoring the cylinder in which the piston operates.

In the past, it was generally the practice to connect the piston to a connecting rod by means of a steel pin. Due to the fact that such pins sometimes may be longitudinally displaced and thus scrape on the cylinder wall, causing scoring of the engine cylinder, it then was deemed feasible to shorten the steel pin and insert aluminum plugs into the open end of the wrist pin bores. However, these plugs have a tendency to become loose during engine operation if they are not tightly assembled. If not kept tight they have a tendency to spin and wear away allowing the steel pin to shift, which will result in a piston failure due to inadequate supporting area or possible disengagement with one side of the piston. Also, excessive pressures are sometimes developed due to thermal expansion of the plugs, which pressure forces these plugs against the cylinder walls causing excessive wear and alternate piston failure.

It is an object of my present invention to eliminate the aforesaid difficulties by constructing a complete composite fabricated wrist pin structure having a central portion provided with a hardened steel surface for engagement with a connecting rod and piston and extended aluminum ends constructed to minimize end wear and thus serve to properly locate the pin.

An object of the invention is to provide an improved wrist pin construction for engine pistons by providing a composite fabricated assembly in which a steel sleeve is positively medially located and fixed to an aluminum pin, thereby providing a construction which substantially eliminates all chance of piston failure.

For a more detailed understanding of the invention, reference may be had to the accompanying drawing illustrating a preferred embodiment of the invention wherein like parts are referred to by like characters throughout the several views, and in which:

Fig. 1 is a vertical sectional view through an engine piston, showing my improved wrist pin construction;

Fig. 2 is an elevational view of the aluminum pin structure; and

Fig. 3 is a detail transverse sectional view taken substantially on the line 3—3 of Fig. 1 and showing how the steel sleeve is mounted and secured to the aluminum pin.

While my wrist pin structure is here shown as assembled to a conventional piston of an internal combustion engine, it will of course be understood that my improved wrist pin is readily adapted to any type of piston. In general, a piston 10 is operable in a cylinder 11 and is connected by a wrist pin structure 12 to a connecting rod 14 which may be connected in a conventional manner with a crank (not shown) of an engine or other power plant.

The wrist pin assembly as shown in the preferred embodiment illustrated in the accompanying drawing comprises an aluminum pin 15 having a central portion 16 of a diameter to fit within a bore 17 of a steel sleeve 18. The pin is provided with end portions 20 of reduced diameter and shoulders 21. The steel sleeve 18 has the ends of the bore 17 internally champfered as at 22 providing an annular recess 19 at the ends thereof about the pin 15.

The pin and sleeve assembly is adapted to fit in bores 23 carried by the piston 10 and the connecting rod 14 is assembled to this pin assembly. A suitable swaging tool may be utilized to secure the pin to the sleeve, said tool being engaged against the shoulder 21 and is suitably actuated to swage out a portion of the aluminum pin into the recess 19 of the sleeve. The swaged out portions 25 form outwardly projecting lugs preferably angularly spaced and three or four of such swaged out lugs are sufficient to secure the sleeve to the pin.

It will be observed that the sleeve is symmetrically located on the pin and that the end portions of said sleeve are supported in the piston bores 23, while the center portion of the sleeve supports the connecting rod. The length of the enlarged diameter portion 16 of the pin 15 is preferably designed slightly less than the overall length of the sleeve 18 and greater than the straight internal bore 17 of the sleeve, so as to provide clearance permitting the swaging of said lug portions into the chamfered recess of the sleeve, to locate and secure the sleeve and pin assembly.

While I have illustrated and described but one embodiment of my invention, it will be apparent to those skilled in the art to which my invention pertains that various modifications and changes may be made therein without departing from the spirit of my invention or from the scope of the appended claims.

I claim:

1. A piston and wrist pin assembly for an engine comprising a pin constructed of a soft material such as aluminum or the like and of a total length substantially equal to the diameter of the piston to which it is assembled, said piston having diametrically opposed wrist pin bearing bores, a sleeve fitted on the medial portion of said pin and constructed of a steel material having a hardened outer cylindrical surface, said sleeve bore having internally champfered ends forming an annular recess, said pin having reduced diameter end portions providing an annular shoulder axially spaced inwardly from the ends of said pin, and an outwardly swaged pin part distorted from said shoulder portion and forced into said annular recesses of the sleeve to secure and locate said sleeve on said pin, said medial enlarged diameter portion of said pin having a length slightly less than the overall length of said sleeve and greater than the length of the straight internal bore of said sleeve, said end faces of the axial pin being unaffected by said swaging and comprising the only part of said wrist pin assembly that may contact the engine cylinder wall with which said piston is operable.

2. A wrist pin structure comprising a pin constructed of a soft material such as aluminum or the like, and of a total length substantially equal to the diameter of the piston to which it is assembled, said piston having diametrically opposed wrist pin bearing bores, a sleeve fitted on the medial portion of said pin and constructed of a steel material having a hardened outer cylindrical surface for providing a bearing for an engine connecting rod, said sleeve having internally champfered ends forming an annular recess, said pin having reduced diameter end portions providing an annular shoulder axially spaced from the ends of said pins and outwardly swaged pin parts distorted from said shoulder and forced into said annular recesses of the sleeve to secure said sleeve to said pin, the distance between the end faces of said pin remaining unchanged after swaging said outwardly swaged pin parts comprising angularly spaced lugs interlocking with said sleeve to centrally locate and secure the sleeve to said pin.

3. A wrist pin structure comprising a pin constructed of a soft material such as aluminum or the like and of a total length substantially equal to the diameter of the piston to which it is assembled, a sleeve fitted on the medial portion of said pin and constructed of a steel material having a hardened outer cylindrical surface for providing a bearing for an engine connecting rod, said sleeve bore having internally champfered ends forming an annular recess, said pin having reduced diameter end portions and outwardly swaged portions forced into said annular recess of the sleeve to secure said sleeve rigidly to said pin, said reduced end portions of the pin providing annular shoulders with respect to the larger diameter medial portion and which are symmetrically arranged and longitudinally spaced apart a distance slightly less than the overall length of said sleeve, said outwardly swaged portions distorted from said shoulders and providing for assembly of the pin with said sleeve without effecting the initial overall length of said pin and the diameter of said reduced end portions of the pin.

References Cited in the file of this patent
UNITED STATES PATENTS

| | | |
|---|---|---|
| 1,670,564 | Breer | May 22, 1928 |

FOREIGN PATENTS

| | | |
|---|---|---|
| 651,787 | France | Oct. 15, 1928 |